United States Patent [19]

De Haan

[11] Patent Number: 6,084,588
[45] Date of Patent: Jul. 4, 2000

[54] INTERACTION BETWEEN MOVING OBJECTS AND MATTE DERIVED FROM IMAGE FRAMES

[75] Inventor: Gisbert De Haan, Montreal, Canada

[73] Assignee: Discreet Logic, Inc., Montreal, Canada

[21] Appl. No.: 08/824,691

[22] Filed: Apr. 8, 1997

[30] Foreign Application Priority Data

Apr. 12, 1996 [GB] United Kingdom ............... 9607649

[51] Int. Cl.[7] ................................................. G06T 15/70
[52] U.S. Cl. ............................................................. 345/419
[58] Field of Search ................................... 345/426, 419, 345/435

[56] References Cited

U.S. PATENT DOCUMENTS

| | | | |
|---|---|---|---|
| 4,943,938 | 7/1990 | Aoshima et al. | 364/522 |
| 5,287,446 | 2/1994 | Williams et al. | 345/474 |
| 5,415,548 | 5/1995 | Adams | 345/435 |
| 5,513,303 | 4/1996 | Robertson et al. | 345/419 |
| 5,566,073 | 10/1996 | Margolin | 345/427 |
| 5,706,417 | 1/1998 | Adelson | 345/474 |

*Primary Examiner*—Mark R. Powell
*Assistant Examiner*—Huedung X. Cao
*Attorney, Agent, or Firm*—Skjerven, Morrill, MacPherson, Frankling & Friel, LLP; Omkar K. Suryadevara

[57] ABSTRACT

Image data is processed consisting of a first data set representing a polarity of moving objects and a second data set derived from two dimensional video frames. Three dimensional video objects are perceived as moving in three dimensional space in response to a trajectory definition. The trajectories of the moving objects is modified in response to the position of the two dimensional video frames. The modification may be affected in response to a matte or key signal derived from the video images, allowing the foreground video image to be combined with three dimensional moving particles.

18 Claims, 7 Drawing Sheets

INTERACTION BETWEEN MOVING OBJECTS AND MATTE DERIVED FROM IMAGE FRAMES

The present invention relates to a method of processing image data in the field of film, video or computer image generation.

INTRODUCTION

It is known in the field of computer graphics to produce a displayed image in the form of a three dimensional particle source. Such images may visually resemble a point source of particles issuing either omnidirectionally or directionally in virtual 3-D space, as viewed on a two dimensional display device.

In the field of film and video image processing, it is known to produce a two dimensional matte. For example, such a matte may be produced by filming an object against a coloured background, for example, a saturated blue background and then producing image data corresponding only to the object, having the blue background removed.

SUMMARY OF THE INVENTION

According to the first aspect of the present invention, there is provided a method and apparatus for processing image data, wherein a first data set represents a plurality of moving objects perceived as moving in three dimensional space; a second data set is derived from two dimensional video frames; and the trajectories of said moving objects are modified in response to the position of said two dimensional video frame.

The preferred embodiment, the three dimensional objects are defined in three dimensional world space that's three dimensional vertex locations, which may be rendered for two dimensional display.

BRIEF DESCRIPTION OF THE DRAWINGS

Preferred embodiments and methods according to the present invention will now be described by way of example only, with reference to the accompanying drawings in which.

DETAILED DESCRIPTION OF THE PREFERRED EMBODIMENT

It will be understood herein that whilst objects and image mattes of a displayed image are described as moving in 2-D and 3-D spaces, as perceived either by a viewer or as modelled in a computer algorithm, such objects and image mattes relate to actual colour pixels on a display device, controlled in accordance with data relating to such pixels. Manipulation and processing of objects and images described hereunder exist as manipulation and processing of corresponding data by an image data processor.

Figure 1:
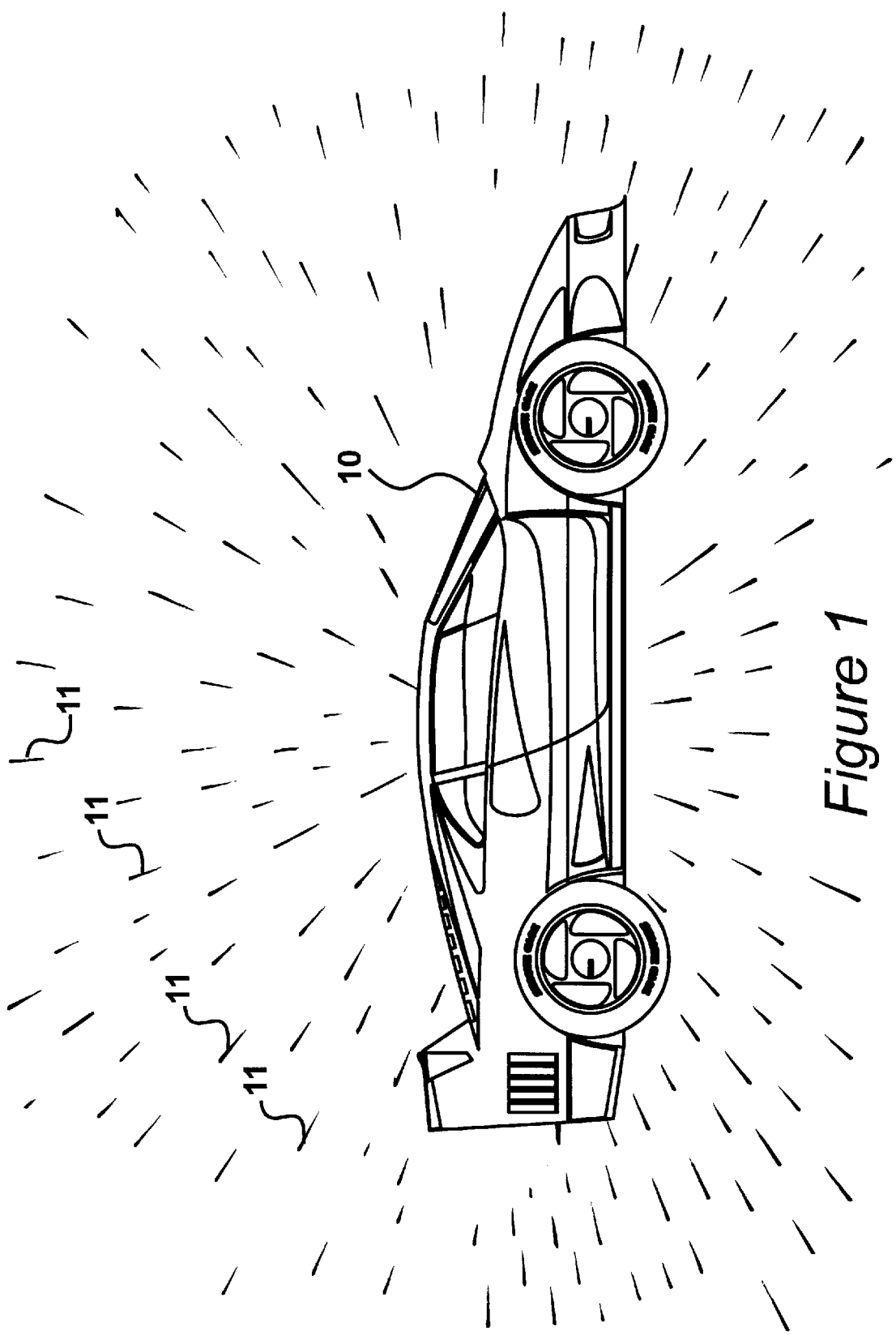
FIG. 1 shows a first image produced in accordance with a first preferred method of the present invention.

Referring to FIG. 1 of the accompanying drawings, there is shown a first image produced in accordance with a first preferred method of the present invention. The first image shown is an I+Nth frame of a video image derived from video image data and displayed on a display device.

The first image comprises a video matte 10, in this case in the form of a car. The video matte comprising a plurality of video pixels, each generated in accordance with corresponding video pixel data, and a plurality of objects 11 each generated from object data, and each of which appear to move in three dimensional space, sometimes referred to as three dimensional world space, on the displayed image.

The video matte exists in a two dimensional control plane, which is introduced into the three dimensional world space.

Specific x, y coordinates corresponding to the video matte, each constitute a moving object generation site. A plurality of said moving object generation sites are distributed over the matte. The moving object generation sites operate in accordance with a computer algorithm as described hereunder, which is modified in accordance with the information contained by the matte data.

The matte data may comprise information on intensity or color of the pixels. For example, in the example shown in FIG. 1, a video matte of a car is shown. The car has light areas corresponding to the windows of the car and darker areas corresponding to the bodywork of the car. Darker areas of the matte image may have a higher density of moving object generation sites, whereas lighter areas corresponding to the windows of the matte image, may have a lower density of moving object generation sites, the overall effect between successive frames of the image sequence corresponding to FIG. 1 being that the moving objects 11 appear to emanate from specific areas of the bodywork, each specific area of the car bodywork comprising a moving object generation site. The moving objects appear to emanate in three dimensional world space away from the car.

In addition to intensity or color information of the video matte, the speed and direction in 3-D world space of the objects and their rate of generation may be controlled in accordance with the matte image data parameters, e.g., intensity or color.

Figure 2:
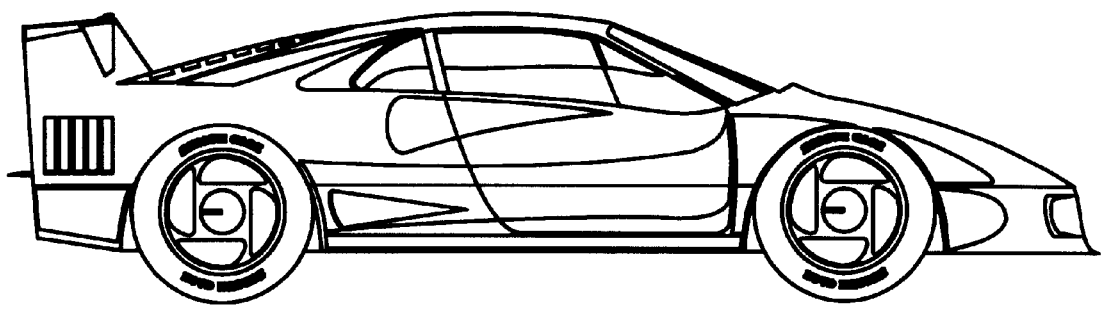
FIG. 2 shows a matte image as displayed on a display device, the matte image comprising the image of FIG. 1.

Referring to FIG. 2 of the accompanying drawings, there is shown a two dimensional video matte image. The two dimensional video matte image exists in a two dimensional control plane within the 3-D world space and exists as a two dimensional matte image data which can be stored in a computer data storage means, e.g., a high capacity disk drive array, on a frame-by-frame basis. In real-time, the two dimensional video matte image may move between successive video frames.

Figure 3:
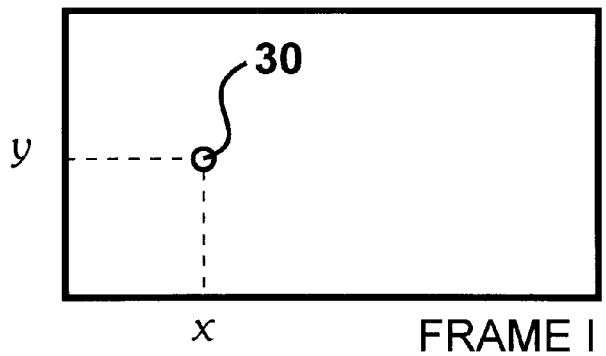
FIGS. 3(a) through 3(c) show in block diagram form steps of generation of individual object images of the image of FIG. 1.
Figure 3:
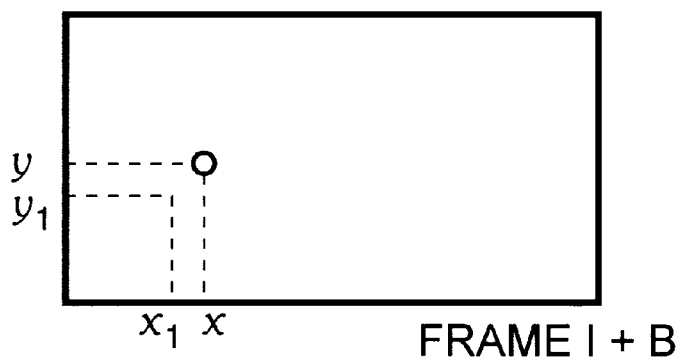
Figure 3:
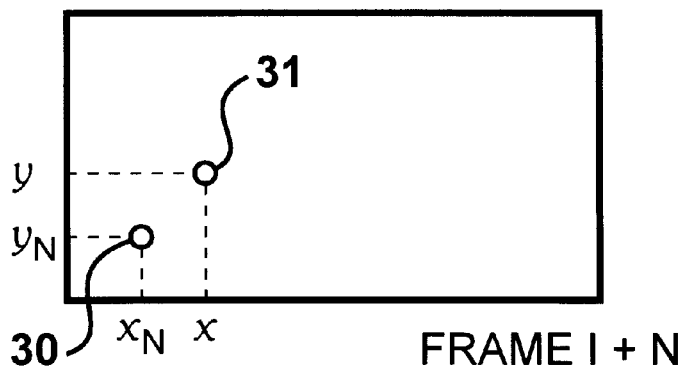

Referring to FIG. 3 of the accompanying drawings, there is shown schematically a displayed computer generated graphics image, on the screen of a display device. A portion of the data corresponding to a position x, y of the image in 3-D world space is controlled in accordance with an algorithm stored in a computer, such as to generate a moving object 30. The moving object may be an image of, for example, a raindrop, an area of high intensity light, a speckle, a spot, a particle or other image. The precise form of image may be stored in the computer, and operated on by means of the algorithm.

FIGS. 3(a) to (c) show a sequence of events on progressive frames of the computer generated image as displayed on the video display device. In FIG. 3(a) the particle 30 is generated at position x, y in accordance with the algorithm. In FIG. 3(b) in I+Bth frame, the object 30 has moved to a new position x1, y1 with, movement of the object being controlled by the computer algorithm.

After N frames of the computer generated image, the object 30 which originated at position xy, has been moved in accordance with the computer algorithm to a position XN, YN. In the I+Nth frame, a new object 31 is generated at the generation site x, y.

The overall effect as viewed on the display device is for a series of objects to be generated one after another and each follow a path in the image plane. The path as viewed in the image corresponds to a path in three dimensional space modelled by the computer algorithm, such that the overall effect as viewed by an observer is that the particles appear to emanate from a point source in space either towards or away from the viewer. The particles need not necessarily travel in straight lines in 3-D space, although in a preferred embodiment of the algorithm, particles do appear to travel in a straight line in 3-D space.

Figure 4:
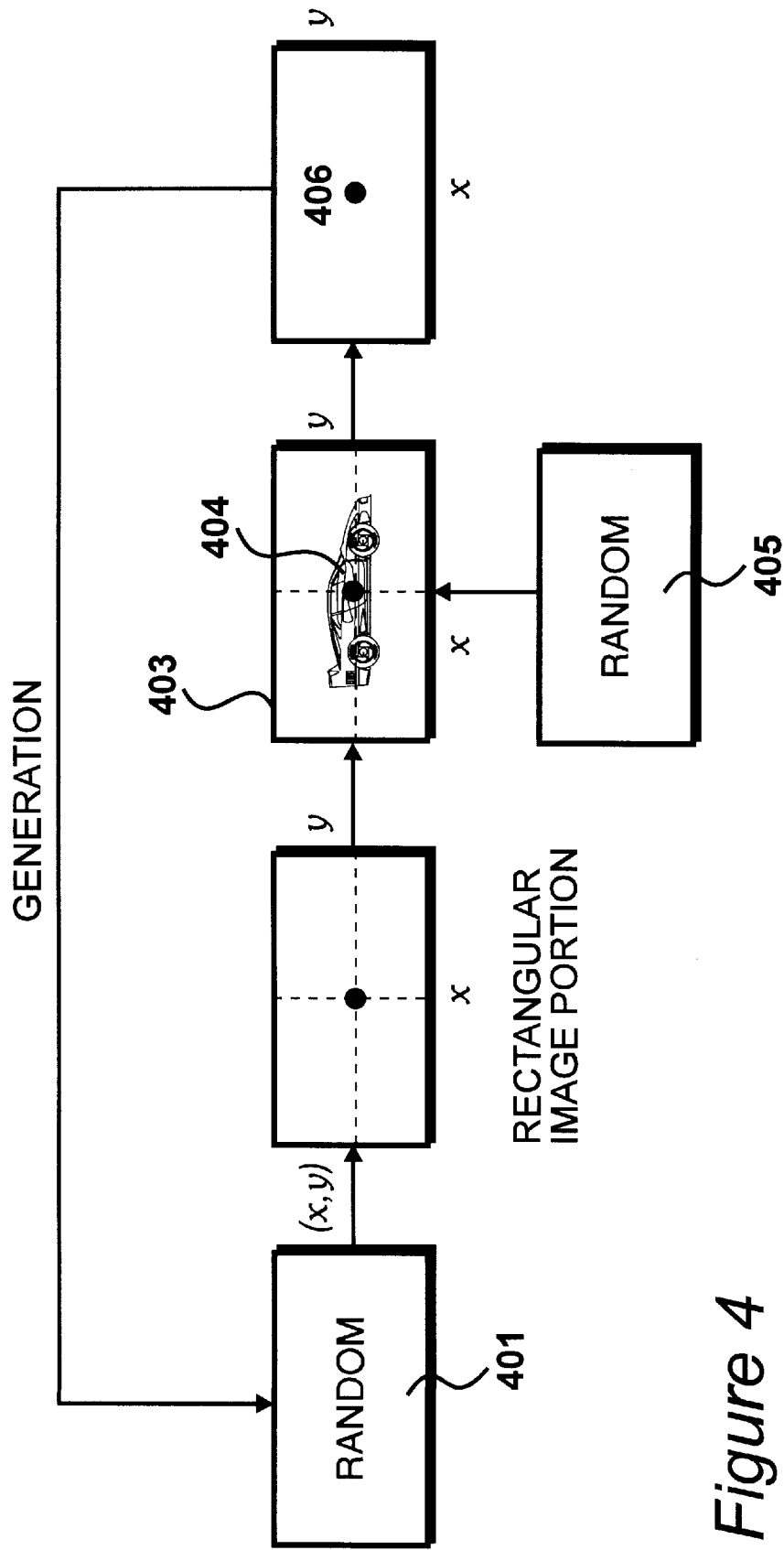
FIG. 4 illustrates the steps comprising a first preferred method.

Referring to FIG. 4 of the accompanying drawings, there is shown schematically a method of generation of a moving object at a generation site corresponding to position xy in an image frame.

A first random number generator 401 may generate a first random number data corresponding to an xy position in a rectangular image frame 403. The xy position is designated as a moving object 406 generation site in the frame 403. A video matte image 404 is keyed into the frame 403 and modelled in the algorithm as being in the same plane as the 2-D control plane. A second random number generator 405 may be used to generate a second random number.

Depending upon the value of the random number an object may be generated or not generated at the xy position in accordance with a predetermined algorithm stored in the processor. In addition to the random number generated by the second number generator, the computer algorithm takes into account the specific value of the matte data at the xy position in determining whether a moving object is generated or not generated. The algorithm may designate a moving object color parameter in accordance with the value of the matte, with the matte value at the xy position, or may allocate another characteristic of the moving object, for example its subsequent path away from position xy in 3-D world space in accordance with the matte value at the position xy.

Figure 5:
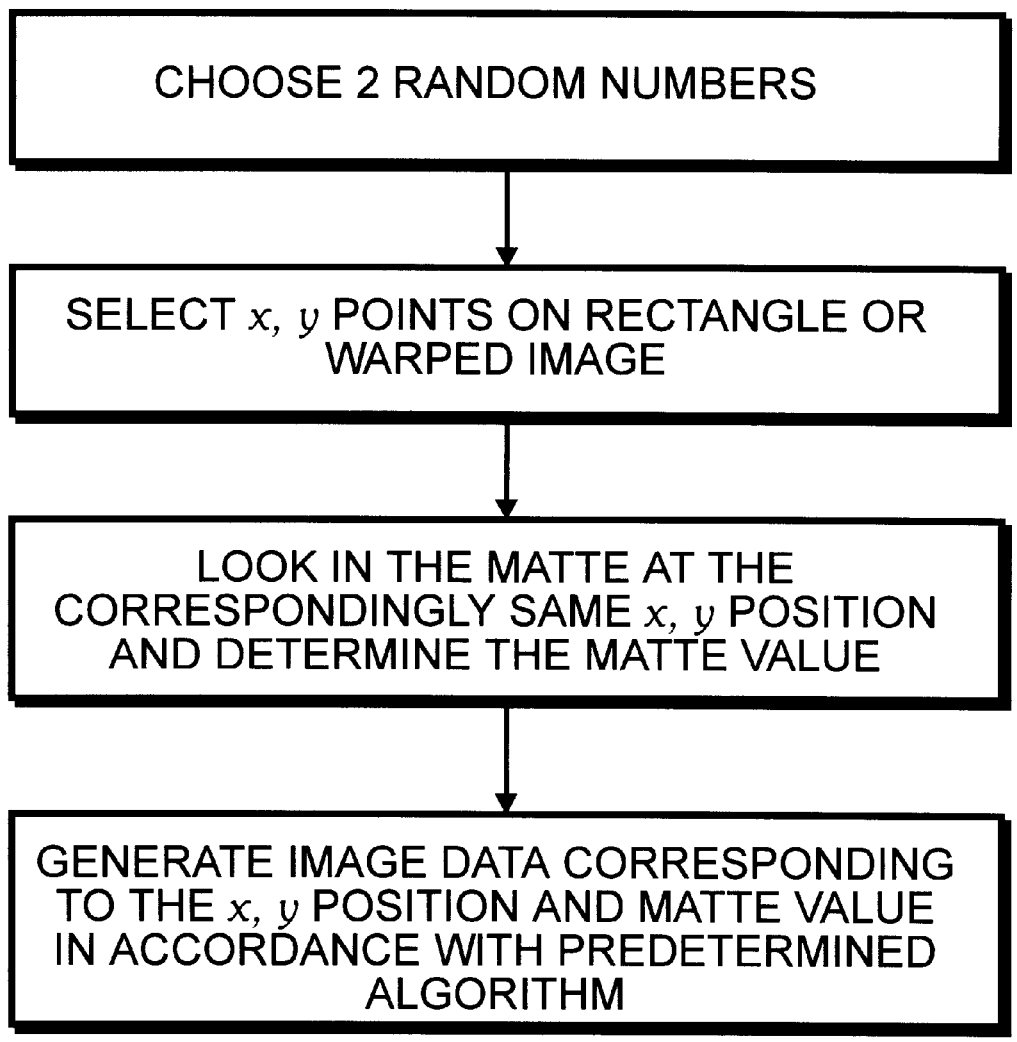
FIG. 5 further illustrates steps comprising the first preferred method.

Referring to FIG. 5 of the accompanying drawings, there are shown specific steps comprising the first specific method herein.

Figure 6:
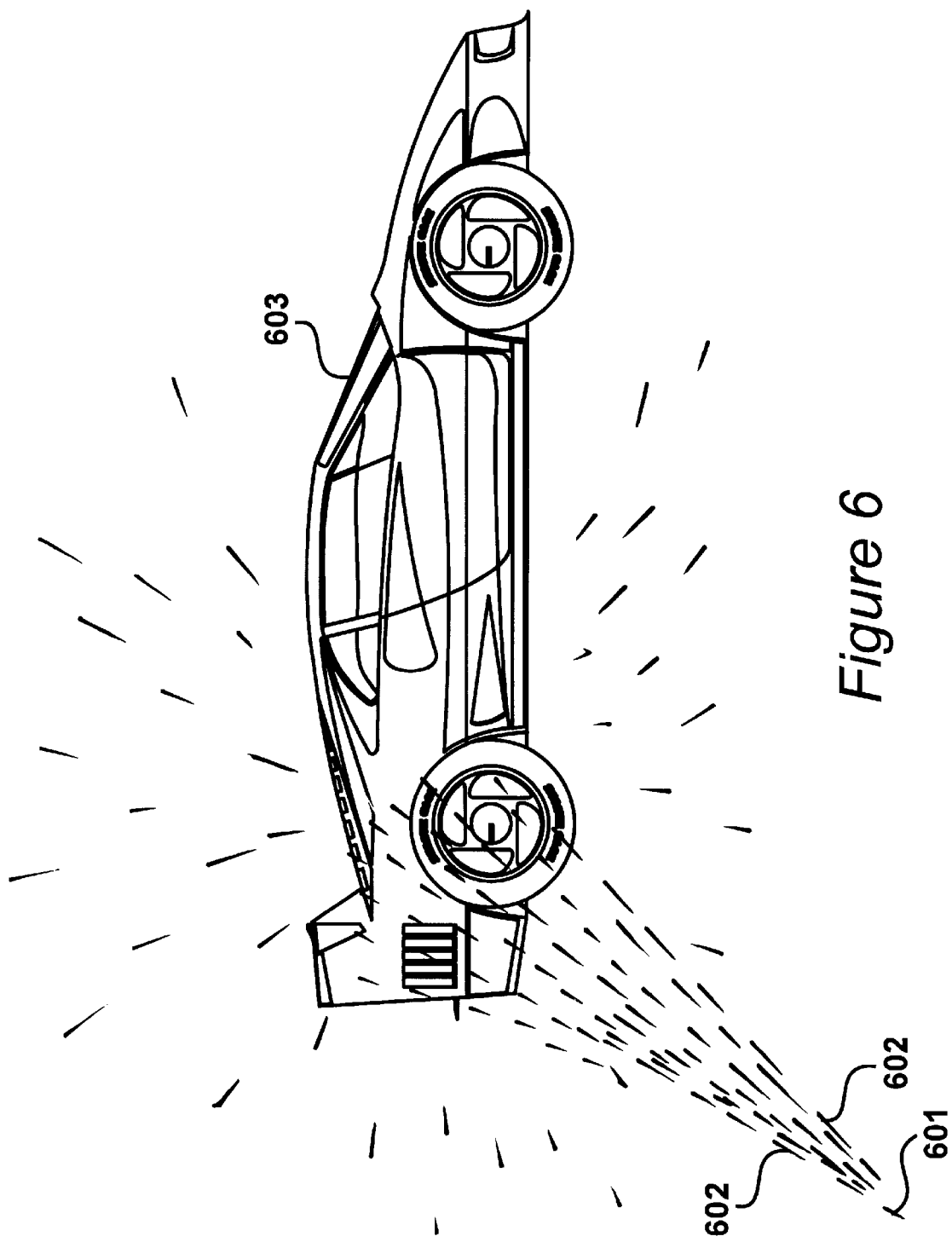
FIG. 6 shows a second image generated in accordance with a second preferred method according to the present invention.
Figure 7A:
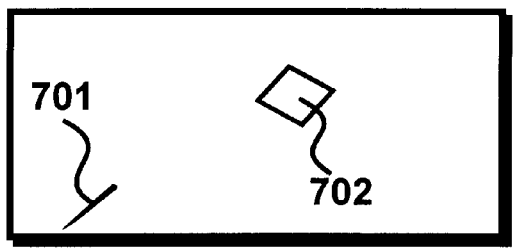
FIGS. 7(a) through 7 (f) show schematically successive image frames generated in accordance with a preferred method according to the present invention.
Figure 7B:
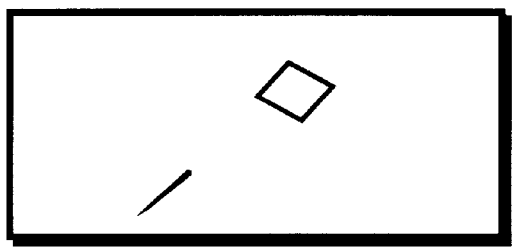
Figure 7C:
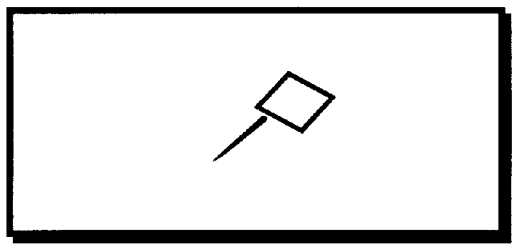
Figure 7D:
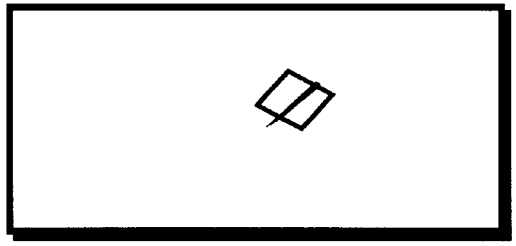
Figure 7E:
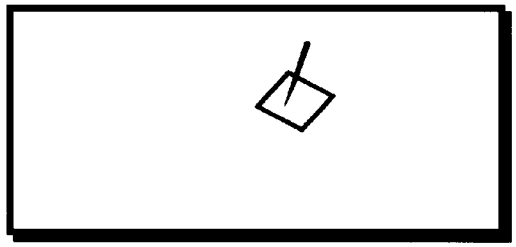
Figure 7F:
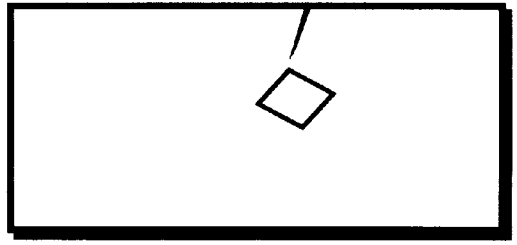

Referring to FIG. 6 of the accompanying drawings, there is shown a second image frame generated in accordance with the second specific method according to the present invention.

In the second image frame, a computer generated moving object source 601 generates a plurality of moving objects in accordance with another computer algorithm in 3-D world space, the moving object source 601 emanating a plurality of moving objects 602 on a frame-by-frame basis which appear to move in 3-D world space across the displayed image in successive frames. Movement of the moving objects may be predefined to be in a general direction or may be omnidirectional in 3-D world space.

The trajectories of the moving objects are modified on a frame-by-frame basis in accordance with the data of the 2-D video matte image 603 which exists as a 2-D control plane in the 3-D world space algorithm. For example, where the moving object source 601 appears to spray moving objects in the general direction of the video matte image 603, upon individual objects reaching a position in three dimensional world space which corresponds with an xy position of the video matte in the two dimensional control plane, the computer algorithm acts to redirect the trajectory of the individual particles in three dimensional world space in accordance with a matte value. For example, the matte value may give the intensity of the matte value data at the coordinates xy.

An overall result may be that a matte image of a matte object, e.g., the car in FIG. 6, may appear to redirect particles in virtual three dimensional space, such that the particles are deflected from the matte object. The direction of deflection of the particles in three dimensional world space is determined in accordance with the matte value, for example, an intensity value or color of the data corresponding to the matte image portion at position xy.

A modification to the second specific method will now be described with reference to FIGS. 7(a) through 7(f) herein.

Referring to FIGS. 7(a) through 7(f) of the accompanying drawings, there is shown a sequence of data image frames describing a moving object 701, moving in three dimensional world space towards a control surface 702 also defined in three dimensional world space. The control surface 702 may be a 3-D curved surface, or may be a 2-D control plane oriented in 3-D world space. The trajectory in three dimensional world space of the particle 701 may be altered upon coincidence of the data coordinates of the moving object 701 in three dimensional world space with the control surface 702, in accordance with another computer algorithm controlling modification of the trajectory of the moving object. The trajectory of the moving object is tested against the position of the surface by computer algorithm to see if it intersects the surface. If the trajectory does intersect, then modification of the trajectory is determined by a surface value of at the 3-D coordinate of intersection.

Both the moving object 701 and the surface 702 may move in three dimensional world space. On a frame-by-frame basis, the surface may rotate, shrink, expand or otherwise in three dimensional world space, the coordinates of the surface in three dimensional world space being calculated from frame to frame in accordance with a computer algorithm.

Whilst the sequence of data image frames in FIGS. 7(a) through 7(f) show a single moving object and a single segment of surface 702, a moving object generator may produce a plurality of moving objects in the form of droplet images, high intensity regions, or particle images etc. directed in 3-D world space in the general direction of the surface 702.

Further, surface 702 may form a segment of a larger overall three dimensional surface, for example a 3-D surface of an object in three dimensional world space.

The trajectory of the moving object 701 in three dimensional world space may be determined by a surface value of the surface 702. For example, where a value of surface intensity is strong, a moving object may be reflected from the surface. Where a surface intensity is weak, an object may pass through the control surface.

The trajectories of the objects may be similarly controlled by the surface values of the 2-D matte image.

I claim:

1. A method of processing image data, wherein the method comprises:

receiving a first data set that represents a plurality of objects perceived as moving in three-dimensional space and having perceived trajectories;

receiving a second data set that includes a matte derived from two dimensional video frames, said matte being a subset of said second data set, each data in said subset having a matte value; and modifying the perceived trajectories of said objects in response to corresponding matte values.

2. A method according to claim 1, wherein said three dimensional objects are defined in three-dimensional world space as three-dimensional vertex locations.

3. A method according to claim 2, wherein said three-dimensional vertex locations are rendered for two-dimensional display.

4. A method according to claim 1, wherein the positions of said objects are modified on a frame-by-frame basis.

5. A method according to claim 1, wherein said matte is derived by recording a foreground object against a coloured background.

6. A method according to claim 5 further comprising:

keying the matte to associated video frames on a frame-by-frame basis, so as to provide a moving video image of said matte in combination with the objects perceived as moving in the three-dimensional space.

7. The method of claim 1 wherein:

during said modifying, at least one of the speed and direction of the objects are controlled in accordance with the second data set.

8. The method of claim 1 wherein:

during said modifying, a rate of generation of the objects is controlled in accordance with the second data set.

9. The method of claim 1 wherein:

during said modifying, the perceived trajectories are redirected when the objects reach a position corresponding to the position of the matte.

10. The method of claim 1 wherein:

during said modifying, a subsequent trajectory away from a position of the matte is allocated in accordance with the matte value at the position.

11. The method of claim 1 wherein:

said modifying causes the objects to appear to emanate from specific areas of the matte.

12. The method of claim 1 wherein:

a plurality of moving object generation sites are distributed over the matte; and said modifying includes using said matte values at corresponding positions.

13. The method of claim 12 wherein:

darker areas of the matte have a higher density of moving object generation sites than lighter areas of the matte.

14. Image processing apparatus, comprising:

means for receiving a first data set representing a plurality of objects perceived as moving in three-dimensional space and for receiving a second data set including a matte derived from two dimensional video frames, said matte being a subset of said second data set, each data in said subset having a matte value; and processing means configured to process the trajectories of said objects so as to modify said trajectories in response to corresponding matte values.

15. The image processing apparatus of claim 14 further comprising:

a first random number generator for generating a first number, the first number indicating a position to the processing means; and a second random number generator for generating a second number, the second number indicating to the processing means whether or not an object is to be generated at the position indicated by the first number.

16. The image processing apparatus of claim 14 wherein:

said processing means keys the matte to associated video frames on a frame-by-frame basis, so as to provide a moving video image of said matte in combination with the objects perceived as moving in the three-dimensional space.

17. The image processing apparatus of claim 14 wherein:

said processing means modifies at least one of the speed and direction of the objects in accordance with the second data set.

18. The image processing apparatus of claim 14 wherein:

said processing means redirects the perceived trajectories when the objects reach a position corresponding to the position of the matte.

* * * * *